US008886583B2

(12) United States Patent
Fukazawa et al.

(10) Patent No.: US 8,886,583 B2
(45) Date of Patent: Nov. 11, 2014

(54) RECOMMENDATION INFORMATION EVALUATION APPARATUS USING SUPPORT VECTOR MACHINE WITH RELATIVE DISSATISFACTORY FEATURE VECTORS AND SATISFACTORY FEATURE VECTORS

(75) Inventors: Yusuke Fukazawa, Yokosuka (JP); Mirai Hara, Yokohama (JP); Hidetoshi Ueno, Yokosuka (JP); Masashi Onogi, Kawasaki (JP); Takefumi Naganuma, Yokosuka (JP); Midori Onogi, Yokohama (JP); Shoji Kurakake, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 530 days.

(21) Appl. No.: 12/936,811

(22) PCT Filed: Apr. 2, 2009

(86) PCT No.: PCT/JP2009/056867
§ 371 (c)(1),
(2), (4) Date: Dec. 15, 2010

(87) PCT Pub. No.: WO2009/125711
PCT Pub. Date: Oct. 15, 2009

(65) Prior Publication Data
US 2011/0131168 A1 Jun. 2, 2011

(30) Foreign Application Priority Data

Apr. 10, 2008 (JP) ................ P2008-102801

(51) Int. Cl.
*G06F 17/00* (2006.01)
*G06N 5/02* (2006.01)
*G06F 17/30* (2006.01)

(52) U.S. Cl.
CPC .... *G06F 17/30867* (2013.01); *G06F 17/30029* (2013.01)
USPC ........................................................ 706/46

(58) Field of Classification Search
USPC ........................................................ 706/46
See application file for complete search history.

(56) References Cited

U.S. PATENT DOCUMENTS

2001/0003185 A1* 6/2001 Lee et al. ............... 707/102
2002/0049704 A1* 4/2002 Vanderveldt et al. ..... 707/1
(Continued)

FOREIGN PATENT DOCUMENTS

JP 2000 132559 5/2000
JP 2006-300970 A 11/2006
(Continued)

OTHER PUBLICATIONS

Lu, Yumao "Coupling Feature Selection and Machine Learning Methods for Navigational Query Identification" CIKM 2006 [Online] Downloaded Nov. 28, 2012 http://delivery.acm.org/10.1145/1190000/1183711/p682-1u.pdf?ip=151.207.246.4&acc=ACTIVE%20SERVICE&CFID=212487297&CFTOKEN=78280720&_acm_=1354130666_8e5c5e6897cb371fb39564d723f510f6.*

(Continued)

*Primary Examiner* — Ben Rifkin
(74) *Attorney, Agent, or Firm* — Oblon, Spivak, McClelland, Maier & Neustadt, L.L.P.

(57) ABSTRACT

A content evaluation apparatus and a content evaluation method that can distribute contents that a user potentially needs without any omissions. A history class separation unit generates a separation plane for separating in a separation plane a characteristic vector of a selected content and characteristic vectors of non-selected contents stored in a browsing history table. A user characteristic vector calculation unit generates a user characteristic vector based on an orthogonal vector perpendicular to the separation plane thus generated and stores the user characteristic vector in a user characteristic vector management table. Subsequently, when a recommendation request receiving unit receives a recommendation request, a content evaluation unit evaluates the contents based on the stored user characteristic vector.

9 Claims, 22 Drawing Sheets

(56) References Cited

U.S. PATENT DOCUMENTS

2004/0068486 A1* 4/2004 Chidlovskii ............... 707/3
2006/0112095 A1* 5/2006 Xie et al. .................. 707/5

FOREIGN PATENT DOCUMENTS

JP        2007 073014        3/2007
JP        2007 148878        6/2007

OTHER PUBLICATIONS

Berwick, R. "An Idiot's Guide to Support vector machines (SVMs)" 2003 [Online] Downloaded Apr. 17, 2013 http://www.cs.ucf.edu/courses/cap6412/fall2009/papers/Berwick2003.pdf.*
Office Action issued Sep. 26, 2011 in Korea Application No. 10-2010-7018669 (With English Translation).
Cristianini, N., "Kernal Induced Feature Spaces," Support Vector Machine Nyumon, 1$^{st}$ Edition, Kyoritsu Shuppan Co., Ltd., pp. 34-42, (Mar. 25, 2005), (with English translation).
Sakai, K., "Introduction to Image Processing and Pattern Recognition," 1$^{st}$ Edition, Morikita Shuppan Co., Ltd., p. 7, (Dec. 20, 2006), (with English translation).
International Search Report issued Apr. 28, 2009 in PCT/JP09/056867 filed Apr. 2, 2009.
Extended European Search Report issued Jul. 25, 2012, in European Patent Application No. 09730998.3.
Dawei Song, et al., "An intelligent information agent for document title classification and filtering in document-intensive domains", Decision Support Systems, vol. 44, No. 1, XP-022241233, Sep. 2007, pp. 251-265.
Yutao Guo, et al., "A Personalized Product Recommendation Algorithm Based on Preference and Intention Learning", Proceedings of the Seventh IEEE International Conference on E-Commerce Technology, (CEC'05), XP-010846331, Jul. 19, 2005, 4 pages.
Chinese Office Action issued May 25, 2012, in China Patent Application No. 200980112241.2 (with English translation).
International Preliminary Report on Patentability (IPRP) in counterpart application, WO Patent Application No. PCT/JP2009/056811 dated Dec. 9, 2010, English translation provided by JPO.
Chinese Office Action issued Dec. 20, 2012, in China Patent Application No. 200980112241.2 (with English translation).
Office Action issued Nov. 6, 2012 in Japanese Patent Application No. 2008-102801 (with English-language translation).
Koji Tsuda, "Overview of Support Vector Machine", The Journal of the Institute of Electronics, Information and Communication Engineers, Japan, vol. 83, No. 6, Jun. 25, 2000, pp. 460-466 (with partial English translation).

* cited by examiner

Fig.7

| CONTENT ID | CATEGORY | TITLE | RECOMMENDATION TEXT |
|---|---|---|---|
| C1 | CD | Celine Dion Complete Best | Celine Dion receiving a great deal of attention because of her upcoming Japan tour in March that is her first tour in the country since nine years prior. Due to her song being used for an au LISMO TV commercial, a duet with Yuna Ito, she is becoming increasingly popular recently among the fans of the both of these and many other people in general. With perfect timing, this must-have best-of album is being released as a perfect introduction to all the classic songs of Celine Dion. |
| C2 | DVD (FOREIGN FILM) | L.A. Confidential 10th Anniversary Limited Edition | This movie is set in Los Angeles of the fifties where turf battles were becoming increasingly intense. A murder of six men and women including an ex-detective occurs at a coffee shop in the downtown area. Bud (Russell Crowe), who was a friend of the murdered ex-detective, begins an investigation into the crime. He starts to get close to a beautiful blonde woman named Lynn (Kim Baysinger) who was with the murdered woman. |
| C3 | DVD (MUSIC VIDEO) | Tour: Wild Peace: Final At Saitama Super Arena 2007.1.14 | The Tokyo Ska Paradise Orchestra has wowed audiences around the world as well as in Japan with their "Tokyo Ska". The "Tokyo Ska Paradise Orchestra 2006 "Wild Peace" Tour resulted in their largest and longest tour with more than 70 performances over six months in Japan and Europe. It was also the hardest and toughest one for them. |
| C4 | BOOK | Ryoma-ga-Yuku | A historical novel about Ryoma's heroic life in eight volumes. It depicts from the first scene where Ryoma leaves for the Chiba Dojo to the last scene where Ryoma is assassinated. The contents of the novel include a variety of scenes covering the conditions at the end of the Edo period. Miss Otazu, who is an original character of the novel, is so attractive. |
| C5 | TV PROGRAM | At That Time History Moved Grand Family of the Heian Dynasty | This show takes place during the Heian dynasty in the late 10th century. Conspiracies and political battles among the aristocrats were common in relation to the elite positions in the imperial court. Fujiwarano Michinaga made his debut in the aristocracy at the age of 15. Michinaga, who had experienced the feud of the Fujiwara family, was determined to build a long-lasting peaceful and stable administration with the backing of the Emperor's authority. |

Fig.8

| CONTENT ID | FEATURE VECTOR | | | | | | | |
|---|---|---|---|---|---|---|---|---|
| | FINANCE | TRAVEL | TV | BOOK | MOVIE | MUSIC | SOCCER | ARTISTIC CULTURE |
| C1 | 0 | 0 | 0 | 0 | 0 | 1 | 0 | 0 |
| C2 | 0 | 0 | 0 | 0 | 1 | 0 | 0 | 1 |
| C3 | 0 | 1 | 0 | 0 | 0 | 1 | 0 | 0 |
| C4 | 0 | 0 | 0 | 1 | 0 | 0 | 0 | 1 |
| C5 | 0 | 0 | 1 | 0 | 0 | 0 | 0 | 1 |

*Fig.14*
(a)
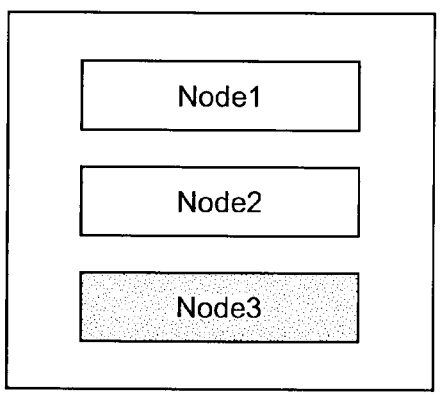
(b)
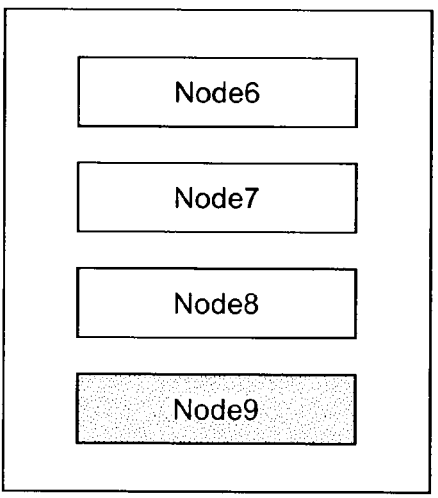

Fig.20
(a)
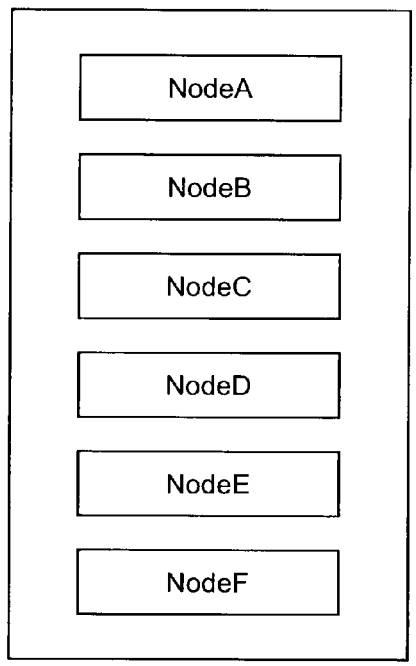
(b)
| SELECTION | NON-SELECTION | | | | |
|---|---|---|---|---|---|
| NodeA | NodeB | NodeC | NodeD | NodeE | NodeF |
| NodeB | NodeA | NodeC | NodeD | NodeE | NodeF |
| NodeC | NodeA | NodeB | NodeD | NodeE | NodeF |
(c)
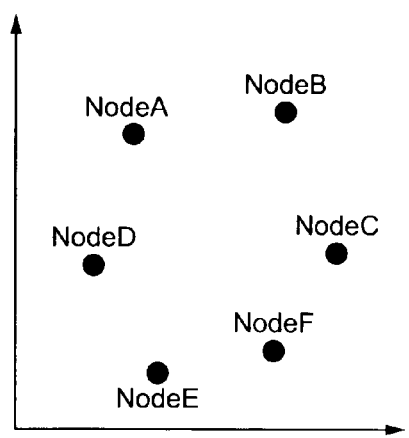
(d)
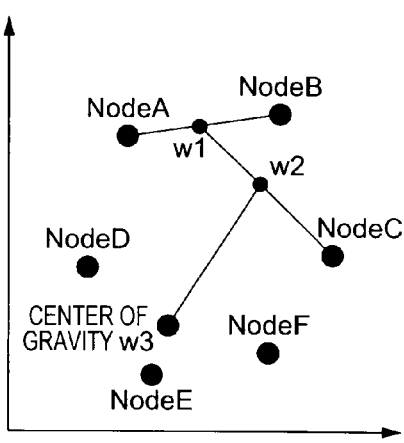

Fig.21

| TERMINAL FUNCTION | CHARACTERISTIC VECTOR | | | | |
|---|---|---|---|---|---|
| | PHONE | INTERNET | TEXT | MEMO | TV |
| INCOMING MESSAGE | 1 | 0 | 1 | 0 | 0 |
| VIDEOPHONE | 1 | 0 | 0 | 0 | 1 |
| ONE SEG | 0 | 1 | 0 | 0 | 1 |
| SCREEN MEMO | 0 | 1 | 0 | 1 | 0 |
| TEXT MEMO | 0 | 0 | 1 | 1 | 0 |

RECOMMENDATION INFORMATION EVALUATION APPARATUS USING SUPPORT VECTOR MACHINE WITH RELATIVE DISSATISFACTORY FEATURE VECTORS AND SATISFACTORY FEATURE VECTORS

TECHNICAL FIELD

The present invention relates to a recommendation information evaluation apparatus and a recommendation information evaluation method for evaluating contents.

BACKGROUND ART

To distribute recommendation information corresponding to characteristics of a user, the Content-based Filtering method has been developed as an information filtering method for extracting the recommendation information. In the method, when a user takes an action such as browsing a Web page, the browsed subject document is analyzed and words (key words) included in the document are extracted. These words are then distinguished by each user and recorded as interest and preference information that is referred to as a user profile. A concept of an interest is expressed in the user profile, and a method for providing information to a user by using the concept has been developed. A system in that an appropriate advertisement can be recommended by matching keywords assigned to an advertisement product or the like and a user profile (that is expressed by the keywords) is generally known, for example.

Technologies associated with the above include the technology that is described in Patent Document 1. Patent Document 1 discloses a technology in that customers to whom recommendation information is to be distributed and recommendation information to be distributed are determined according to predetermined recommendation extraction rules and that the information is then distributed accordingly.

RELATED-ART DOCUMENT

[Patent Document]
Patent Document 1: JP-2007-148878A

DISCLOSURE OF THE INVENTION

Problems to be Solved by the Invention

However, the recommendation information is extracted by matching processing in the background art, and it is determined based on the predetermined recommendation extraction rules in the technology described in Patent Document 1. Therefore, omissions of recommendation information may occur.

In other words, in the technology in Patent Document 1, when tastes and preferences are registered in the recommendation extraction rules, recommendation information corresponding to the tastes and preferences is determined and distributed. In addition, when a user purchases a product, information related to the purchased product is distributed based on the buying history or the like. The information to be distributed is determined based on direct information, such as tastes and preferences, a buying history, and an access history, which may cause omissions of contents that the user potentially needs.

It is considered that the omissions particularly increase when recommendation information is distributed and used based on an access history. Specifically, when a user browses a Web site, for example, the browsed Web site itself is expressed not with a single keyword, but with a plurality of keywords generally. When a user searches and browses information related to a movie a, for example, the browsed Web site includes various kinds of information (vector information), such as introductions of the movie a, the original book, the theaters showing the movie, and the casts. In the case where the user looks for the original book, it is preferable for the user to perform filtering processing that is specialized in the book and to distribute recommendation information for the book alone.

In the technology described in Patent Document 1, however, the browsed Web site is grasped in its entirety, and information similar to the entire Web site is distributed as recommendation information. Therefore, the technology fails to distribute information that users potentially need as described above.

An object of the present invention is to provide a recommendation information evaluation apparatus and a recommendation information evaluation method for evaluating recommendation information that can distribute recommendation information including contents that a user potentially needs without any omissions.

Means for Solving the Problems

To solve the above problems, a recommendation information evaluation apparatus according to the present invention includes: a receiving means that receives a selection of one optional item from a plurality of optional items by a user operation; a storage means that stores a satisfactory feature vector that is a vector of the selected optional item received by the receiving means and dissatisfactory feature vectors that are vectors of non-selected optional items; a user characteristic vector generating means that generates an orthogonal vector perpendicular to a separation plane for separating in a feature space the satisfactory feature vector of the selected optional item and the dissatisfactory feature vectors of the non-selected optional items, which are stored in the storage means, as a user characteristic vector; and an evaluation means that evaluates an unknown optional item based on the user characteristic vector generated by the user characteristic vector generating means.

A recommendation information evaluation method according to the present invention includes: receiving a selection of one optional item from a plurality of optional items by a user operation; storing a satisfactory feature vector that is a vector of the selected optional item received in the receiving step and dissatisfactory feature vectors that are vectors of non-selected optional items; generating a user characteristic vector based on an orthogonal vector perpendicular to a separation plane for separating in a feature space the satisfactory feature vector of the selected optional item and the dissatisfactory feature vectors of the non-selected optional items, which are stored in the storing step; and evaluating recommendation information based on the user characteristic vector generated in the user characteristic vector generating step.

According to the present invention, a selection of one optional item from a plurality of optional items by a user operation is received and a satisfactory feature vector that is a vector of the selected optional item, and dissatisfactory feature vectors that are vectors of non-selected optional items are stored. An orthogonal vector perpendicular to a separation plane for separating in a feature space the satisfactory feature vector of the selected optional item and the dissatisfactory feature vectors of the non-selected optional items, which are stored, is generated as a user characteristic vector, and an unknown optional item is evaluated based on the generated user characteristic vector.

Therefore, recommendation information of unknown optional items, such as contents or operation menu items, can be evaluated in accordance with the vector indicating user characteristics. Accordingly, recommendation information that is to be recommended is evaluated without direct information, such as tastes and preferences of a user, and an access history, which makes it possible to provide the recommendation information to the user without any omissions.

The recommendation information evaluation apparatus according to the present invention preferably further includes a separation plane generating means that generates the separation plane for separating in the feature space the satisfactory feature vector of the selected optional item and the dissatisfactory feature vectors of the non-selected optional items, which are stored in the storage means, and the user characteristic vector generating means preferably generates the user characteristic vector according to the separation plane generated by the separation plane generating means.

According to the present invention, the separation plane for separating in the feature space the satisfactory feature vector of the selected optional item and the dissatisfactory feature vectors of the non-selected optional items is generated and then the user characteristic vector is generated based on the separation plane. Therefore, the user characteristic vector can be generated accurately.

In the recommendation information evaluation apparatus according to the present invention, the separation plane generating means preferably calculates relative position relations between all dissatisfactory feature vectors and satisfactory feature vectors, calculates the position relations such that a dissatisfactory feature vector or a satisfactory feature vector corresponds to another dissatisfactory feature vector or another satisfactory feature vector, respectively, and generates the separation plane based on the position relations.

According to the present invention, it is preferable that position relations of all of the dissatisfactory feature vectors with respect to the satisfactory feature vectors be calculated relatively, and then the separation plane be generated based on the position relations. By doing so, the separation plane can be generated in a relative space indicating relative position relations, and then the user characteristic vector can be generated based on the separation plane. Therefore, it is possible to evaluate recommendation information more accurately.

In the recommendation information evaluation apparatus according to the present invention, the separation plane generating means preferably generates the separation plane based on the SVM method.

In the recommendation information evaluation apparatus according to the present invention, the user characteristic vector generating means preferably generates the user characteristic vector based on the NN method.

In the recommendation information evaluation apparatus according to the present invention, the storage means preferably stores the frequency of selection of an optional item together with the satisfactory feature vector of the optional item, and stores the frequency of non-selection of an optional item together with the dissatisfactory feature vector of the optional item. The user characteristic vector generating means preferably weights the satisfactory feature vector with high frequency of selection depending on the frequency, and weights the dissatisfactory feature vector with high frequency of non-selection depending on the frequency. The user characteristic vector generating means preferably generates the user characteristic vector based on the satisfactory feature vectors and the dissatisfactory feature vectors including the weighted satisfactory feature vector and the weighted dissatisfactory feature vector.

According to the present invention, the frequency of selection of an optional item can be stored together with the satisfactory feature vector of the optional item, and the frequency of non-selection of an optional item can be stored together with the dissatisfactory feature vector of the optional item. The satisfactory feature vector with high frequency of selection can be weighted depending on the frequency, and the dissatisfactory feature vector with high frequency of non-selection can be weighted depending on the frequency. The user characteristic vector can be generated based on the satisfactory feature vectors and the dissatisfactory feature vectors including the weighted satisfactory feature vector and the weighted dissatisfactory feature vector. In this manner, the user characteristic vector can be calculated depending on the frequency, whereby the user characteristic vector can be calculated more accurately. Therefore, it is possible to evaluate recommendation information more accurately.

In the recommendation information evaluation apparatus according to the present invention, the storage means preferably stores the time of selection of an optional item together with the satisfactory feature vector of the optional item. The separation plane generating means preferably generates the user characteristic vector based on the satisfactory feature vector of the optional item that is weighted depending on the recency of the time of selection and non-selection.

According to the present invention, the time of selection of an optional item can be stored together with the satisfactory feature vector of the optional item. In addition, the separation plane can be generated based on the satisfactory feature vector of the optional item that is weighted depending on the recency of the time of selection and non-selection. Therefore, weighting can be applied in view of time-series components, which makes it possible to evaluate recommendation information more accurately.

The recommendation information evaluation apparatus according to the present invention preferably further includes a recommendation information sending means that sends recommendation information generated in accordance with evaluation results by the evaluation means.

According to the present invention, recommendation information that is generated in accordance with the evaluation results by the evaluation means is sent, whereby a user can obtain useful information.

In the recommendation information evaluation apparatus according to the present invention, the optional items are preferably items on a menu screen for browsing a Web page.

In the recommendation information evaluation apparatus according to the present invention, the optional items are preferably items on an operation menu for performing functions of the apparatus.

Effects of the Invention

According to the present invention, recommendation information of unknown optional items, such as contents or operation menu items, can be evaluated in accordance with a vector indicating user characteristics. Therefore, recommendation information that is to be recommended is evaluated without direct information, such as tastes and preferences of a user, and an access history, which makes it possible to provide the recommendation information to the user without any omissions.

BRIEF DESCRIPTION OF THE DRAWINGS

FIG. 7 is an explanatory diagram showing stored contents in a content management table 205a.

FIG. 8 is an explanatory diagram showing stored contents in a content characteristic vector management table 207b.

FIG. 14 is an explanatory diagram showing menu screens in a history event a and a history event b.

FIG. 20 is a conceptual diagram showing a process for calculating the user characteristic vector by the NN method in chronologically accessed order.

FIG. 21 is an explanatory diagram showing parameters of characteristic vectors in a feature space related to the operation.

Figure 1:
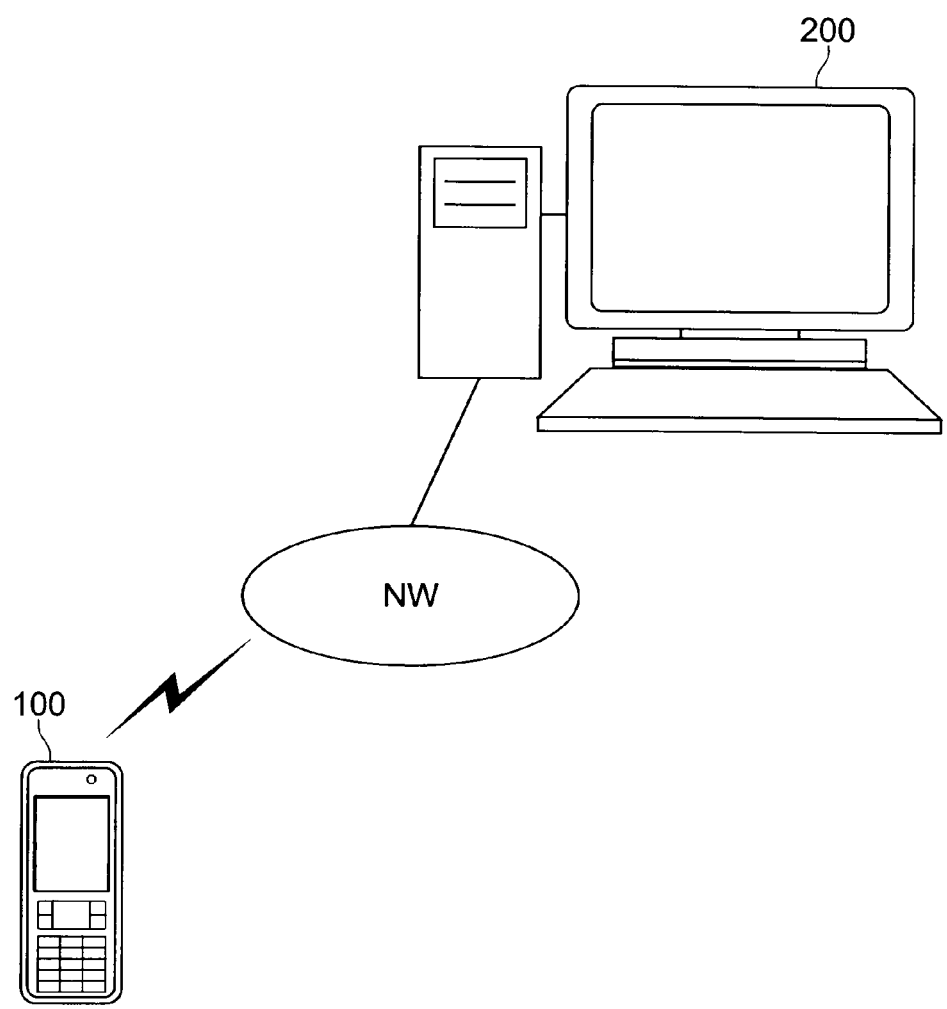
FIG. 1 is a system configuration diagram showing the system configuration of a recommendation information distribution system including a cell phone 100 and an information distribution server 200 according to an embodiment of the present invention.

DESCRIPTION OF THE REFERENCE NUMERALS 100 cell phone
100a cell phone
101 browser
101a operating unit
102 history sending unit
103 recommendation request sending unit
104 distributed information display
104a recommendation operation display
105 history class separation unit
106 user characteristic vector calculation unit
107 operation information evaluation unit
108 operation information storage
109 history storage
200 information distribution server
201 content request receiving unit
202 recommendation request receiving unit
203 history class separation unit
204 user characteristic vector calculation unit
205 distributed information storage
205a content management table
206 content evaluation unit
207 history storage
207a user characteristic vector management table
207b content characteristic vector management table
207c browsing history table
208 content sending unit

EMBODIMENT OF THE INVENTION

Embodiments of the present invention will be described with reference to the accompanying drawings. Like numerals refer to like components, and redundant explanation thereof will be omitted, when possible.

FIG. 1 is a system configuration diagram showing the system configuration of a recommendation information distribution system including a cell phone 100 and an information distribution server 200 according to an embodiment of the present invention. The information distribution server 200 distributes prestored contents serving as recommendation information to the cell phone 100 in response to a request therefrom. The recommendation information to be distributed is compiled based on the access history of a user of the cell phone 100, which the information is considered to be necessary for the user. The contents to be distributed as recommendation information preferably include contents that are not evaluated yet for the user, such as Web contents that are not browsed yet, contents that constitute TV program listings, and contents in which new books to be released or the like are reviewed. The information distribution server 200 obtains contents from other contents providers in response to an access request from the cell phone 100, and distributes the obtained contents thereto. The access history is collected at this time. The information distribution server 200 can be configured to obtain the access history that is sent from the cell phone 100.

Figure 2:
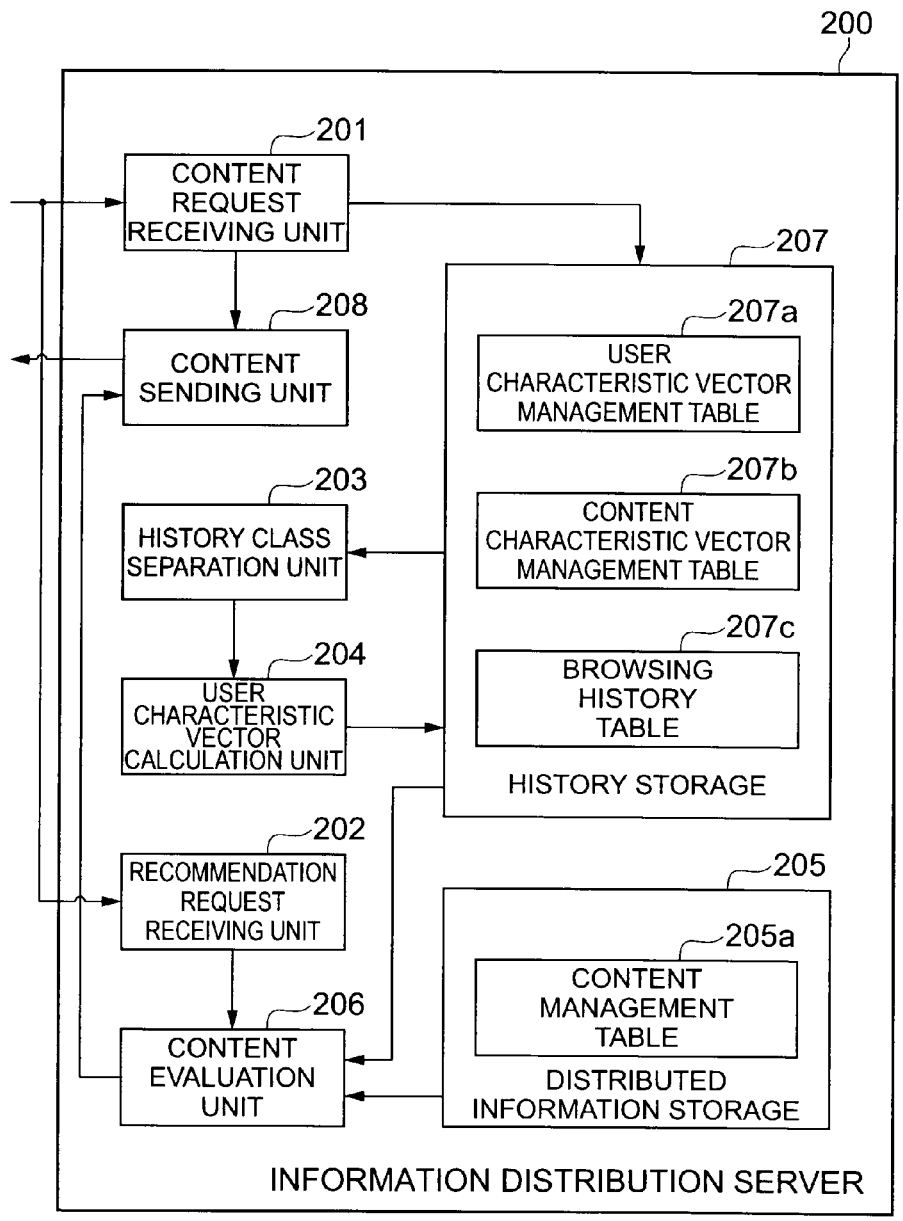
FIG. 2 is a block diagram of the functional configuration of the information distribution server 200.

The configuration of the information distribution server 200 will be described using FIG. 2. FIG. 2 is a block diagram of the functional configuration of the information distribution server 200. The information distribution server 200 is configured to include a content request receiving unit 201 (receiving means), a recommendation request receiving unit 202, a history class separation unit 203 (separation plane generating means), a user characteristic vector calculation unit 204 (user characteristic vector generating means), a distributed information storage 205, a content evaluation unit 206 (evaluation means), a history storage 207 (storage means), and a content sending unit 208.

Figure 3:
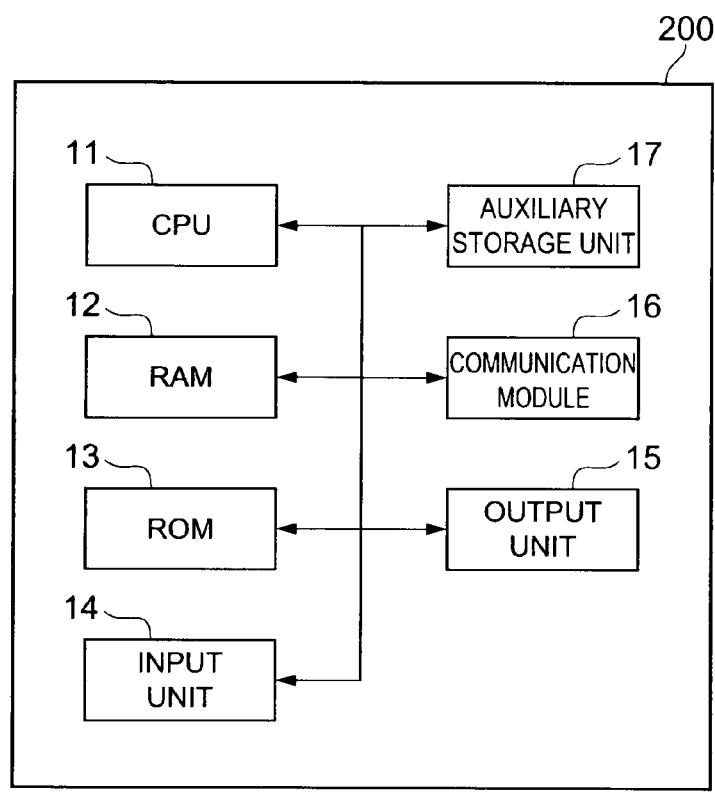
FIG. 3 is a hardware configuration diagram of the information distribution server 200.

FIG. 3 is a hardware configuration diagram of the information distribution server 200. As illustrated in FIG. 3, the information distribution server 200 illustrated in FIG. 2 is physically configured as a computer system that includes a central processing unit (CPU) 11, a random access memory (RAM) 12 and a read only memory (ROM) 13 serving as main storing devices, an input unit 14 such as a keyboard and a mouse serving as an input device, an output unit 15 such as a display, a communication module 16 serving as a data sending and receiving device such as a network card, and an auxiliary storage unit 17 such as a hard disk. The functions illustrated in FIG. 2 are performed by: loading predetermined computer software on the hardware of the CPU 11, the RAM 12 or the like in FIG. 3; operating the input unit 14, the output unit 15, and the communication module 16 under the control of the CPU 11; and reading and writing data from and to the RAM 12 and the auxiliary storage unit 17. Each of the functional blocks will be described based on the functional blocks illustrated in FIG. 2.

The content request receiving unit 201, which obtains contents from contents providers on the network in response to a request for contents from the cell phone 100, can collect the access history by receiving the request for the contents and the URLs thereof from the cell phone 100. The collected access history (e.g., URLs) is output to the history storage 207. The content request receiving unit 201 collects the access history such that actually accessed contents (URLs) on a menu screen (event) are distinguished from contents that are not accessed actually even though being displayed on the menu screen.

The content request receiving unit 201 may receive access history information collected by the cell phone 100 as well as an access request, and output the information to the history storage 207. The cell phone 100 is configured to send access history information to the information distribution server 200 such that selected contents are distinguished from non-selected contents on a menu screen in the same manner as described above.

The recommendation request receiving unit 202 receives a distribution request for recommendation information from the cell phone 100 together with a user ID of the user of the cell phone 100. When receiving the distribution request, the recommendation request receiving unit 202 informs the content evaluation unit 206 of the receipt and instructs the unit to evaluate the contents stored in the distributed information storage 205 based on a precalculated user characteristic vector. In a modification thereof, the recommendation request receiving unit 202 may output the receipt of a recommendation request to the user characteristic vector calculation unit 204, cause the unit to calculate a user characteristic vector at this point, inform the content evaluation unit 206 of the result, and then cause the content sending unit 208 to distribute the recommendation information.

The history class separation unit 203 generates a separation plane for separating contents browsed by a user into a satisfactory class and a dissatisfactory class based on characteristic vectors of the contents included in the browsing history information that is stored in the history storage 207 (browsing history table 207c). The satisfactory class here means a class including actually selected contents alone among a plurality of contents that are displayed in a selectable state on a menu screen for accessing certain contents. The dissatisfactory class means a class including non-selected contents alone on the menu screen. The history class separation unit 203 can separate these classes by generating a separation plane that can separate characteristic vectors of the contents into the satisfactory class and the dissatisfactory class using the SVM method or the NN method. In the SVM (Support Vector Machine) method, a plane that maximizes the minimum distance between nodes of each class (between characteristic vectors) is defined as a separation plane. In the NN method, a plane that recommends a line connecting the centers of gravity of the classes, that is, a line connecting the center of gravity of the satisfactory class and that of the dissatisfactory class that are calculated based on characteristic vectors of the contents is defined as a separation plane. In the NN method, the separation plane is not necessarily calculated, and the line connecting the center of gravity of the dissatisfactory class and that of the satisfactory class may be defined as a user characteristic vector.

Figure 4:
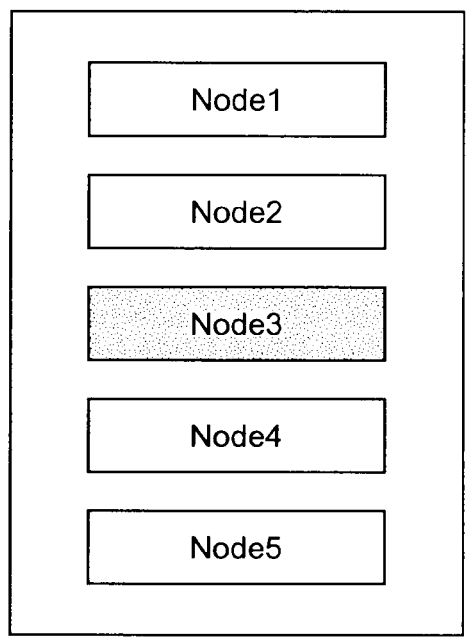
FIG. 4 is an explanatory diagram showing an example of a menu screen displayed on the cell phone 100.

A specific method for generating a separation plane will be described. FIG. 4 is an explanatory diagram showing an example of a menu screen displayed on the cell phone 100. As illustrated in FIG. 4, Node 1 to Node 5 are displayed. The Node indicates an optional item, such as an item distinguished by categories on a menu screen on the Web, and a title of a Web page. Node 1 indicates contents related to cars, and Node 2 indicates contents related to finance, for example. A user selects any of Node 1 to Node 5 to browse the contents corresponding thereto.

Figure 5:
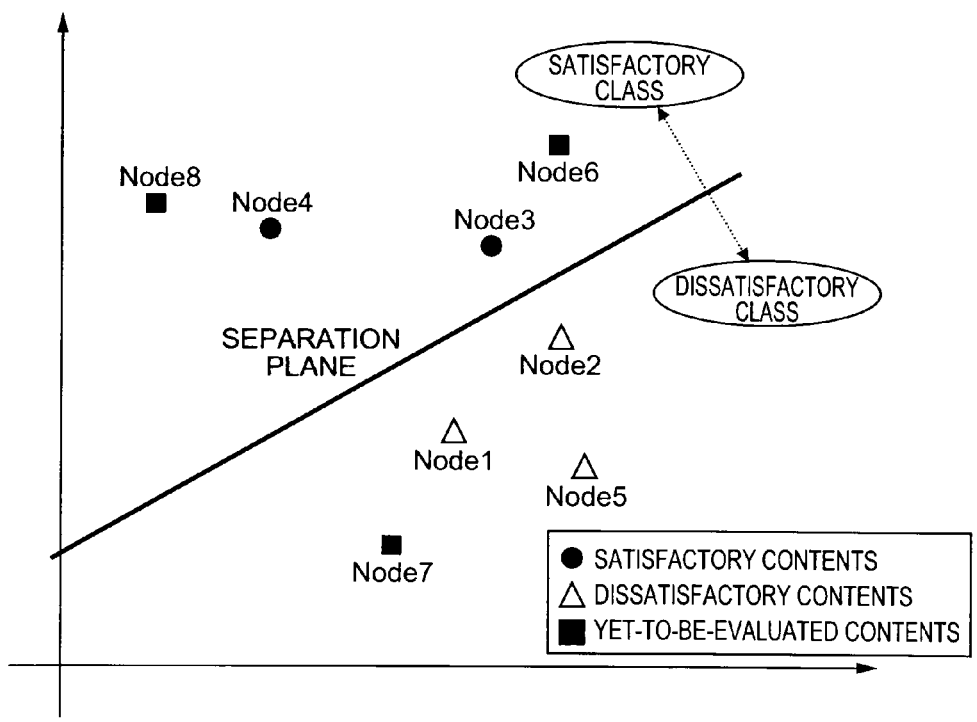
FIG. 5 is a conceptual diagram showing the processing concept when a separation plane is generated.

FIG. 5 is a conceptual diagram showing the processing concept when a separation plane is generated. FIG. 5 shows position relations in a feature space between characteristic vectors of the contents, which include the contents that are selected by a user and the contents that are not selected on the menu screen in FIG. 4. As illustrated in FIG. 5, the parts indicated by circles are satisfactory contents (Node 3 and Node 4), the parts indicated by triangles are dissatisfactory contents (Node 1, Node 2, and Node 5), and the parts indicated by quadrangles are yet-to-be-evaluated contents that are not known (Node 8 and Node 7). The separation plane is generated to separate the satisfactory contents and the dissatisfactory contents. The yet-to-be-evaluated contents are not taken into account in the separation processing. Although the feature space in the diagram is expressed by a two-dimensional plane for convenience, vector axes are present in an amount corresponding to parameters that constitute the vectors. Thus, the feature space is composed of twenty-or-more-dimensional vectors generally.

Figure 6:
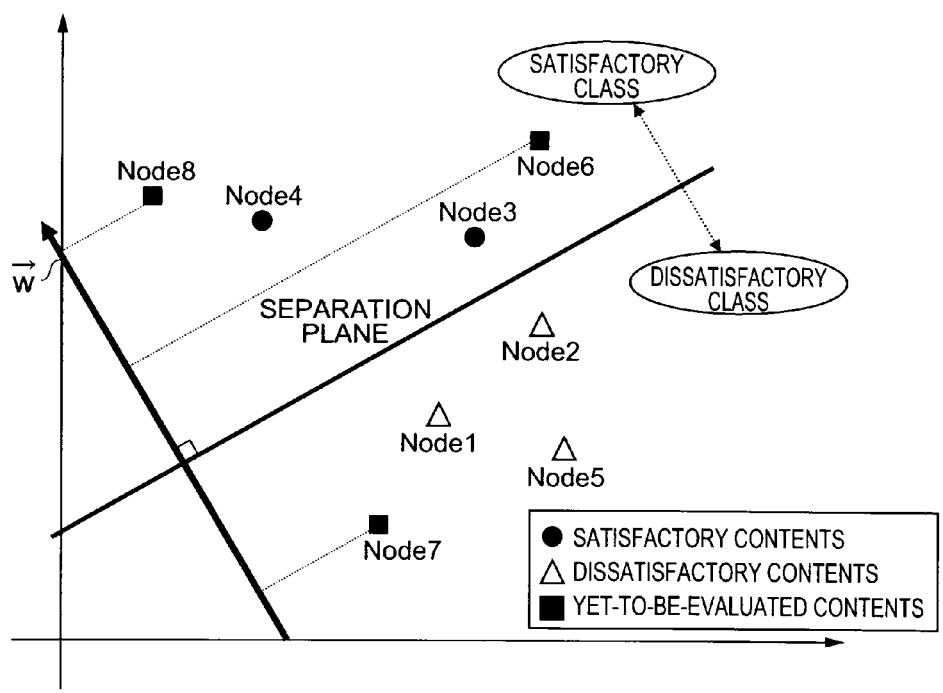
FIG. 6 is a conceptual diagram showing the concept when a user characteristic vector is calculated based on the separation plane and then evaluation is performed based on the user characteristic vector.

The user characteristic vector calculation unit 204 calculates an orthogonal vector perpendicular to the separation plane generated by the history class separation unit 203 to define the vector as a user characteristic vector. FIG. 6 shows a specific example. FIG. 6 is a conceptual diagram showing the concept when a user characteristic vector is calculated based on the separation plane and then evaluation is performed based on the user characteristic vector. As illustrated in FIG. 6, the user characteristic vector calculation unit 204 calculates a user characteristic vector w that is an orthogonal vector perpendicular to the separation plane. The user characteristic vector calculation unit 204 calculates the user characteristic vector every time a browsing history is collected and updates the user characteristic vector stored in a user characteristic vector management table 207a.

The distributed information storage 205, which stores contents (recommendation information) that is an object of distribution and management information thereof, stores a content management table 205a. FIG. 7 is an explanatory diagram showing stored contents in the content management table 205a. As illustrated in FIG. 7, the content management table 205a stores content IDs, categories, titles, and recommendation texts corresponding to each other. The content IDs are identification information for specifying the contents uniquely. The category indicates a type of information related to, for example, CDs, DVDs, books, and TV programs. The title is heading information to be displayed as recommendation information. When distributing recommendation information, the title is displayed. The recommendation text is the main body of recommendation information that is useful information for a user. The information stored in the content management table 205a may be input by an operator in advance, or be searched and extracted from a contents provider automatically to be narrowed down with a predetermined filter.

When the recommendation request receiving unit 202 receives a recommendation request, the content evaluation unit 206 evaluates the contents stored in the distributed information storage 205 based on the user characteristic vector calculated by the user characteristic vector calculation unit 204. The content evaluation unit 206 then generates recommendation information in which the titles of the contents are arranged in descending order of evaluation. More specifically, the content evaluation unit 206 calculates the evaluation value by calculating an inner product of the user characteristic vector and the characteristic vector of each of the contents to generate recommendation information in which the titles of the contents are arranged in descending order of the evaluation values.

The concept is as follows. In FIG. 6, for example, Node 7 and Node 8, which are the information stored in the content management table 205a, are treated as unknown contents. The points of intersection of the perpendiculars from Node 7 and Node 8 with the user characteristic vector w are the evaluation points with respect to the user characteristic vector w. The recommendation information is generated such that the contents (titles) are displayed in descending order of the positions of the intersection points of the perpendiculars with the user characteristic vector. The contents may be displayed or not displayed based on the separation plane. For example, recommendation information may be generated as follows: because the intersection point with the perpendicular from Node 8 is located above the separation plane, Node 8 is considered to receive high evaluation for a user and selected as recommendation information; and by contrast, because Node 7 is located below the basis, it has low evaluation and is not selected as recommendation information.

The history storage 207, which stores history information, stores the user characteristic vector management table 207a, a content characteristic vector management table 207b, and the browsing history table 207c.

The user characteristic vector management table 207a stores a user characteristic vector calculated by the user characteristic vector calculation unit 204 with a corresponding user ID for identifying a user.

The content characteristic vector management table 207b stores characteristic vectors of the contents stored in the content management table 205a with corresponding information for specifying the contents (for example, content IDs and URLs). The content characteristic vector is obtained by the content request receiving unit 201 together with the contents when a user accesses the contents, or is set by an operator when registering the recommendation information. The content characteristic vector management table 207b stores information illustrated in FIG. 8, for example. As illustrated in FIG. 8, a plurality of parameters that constitute the characteristic vectors is stored with the corresponding content IDs. Although eight parameters are illustrated in FIG. 8, the characteristic vector is composed of more parameters generally. Besides the predetermined parameters, keywords that are extracted according to a morphological analysis for each of the contents may be added as parameters. A numerical value between 0 and 1 is described for each of the parameters that constitute the characteristic vector, which indicates that which characteristic vector has the feature.

The browsing history table 207c stores an address received by the content request receiving unit 201 and access history information collected by the unit with, for example, corresponding content IDs (or URLs of the contents) and characteristic vectors of the contents (browsed contents and non-browsed contents). The characteristic vectors of the contents are obtained together with the contents obtained by the content request receiving unit 201.

The content sending unit 208 sends the contents obtained in response to the content request received by the content request receiving unit 201 or the recommendation request received by the recommendation request receiving unit 202. For example, the content sending unit 208 sends the contents obtained in response to the content request received by the content request receiving unit 201, and sends the recommendation information that is generated according to the evaluation results by the content evaluation unit 206 based on the contents stored in the distributed information storage 205 in response to the recommendation request receiving unit 202.

The information distribution server 200 configured as above can distribute recommendation information that is evaluated based on the user characteristic vector in response to a request from the cell phone 100. Accordingly, information such as preferences and tastes does not need to be registered. Without extracting contents alone that are directly related to the accessed contents, recommendation information can be distributed without any omissions.

Figure 9:
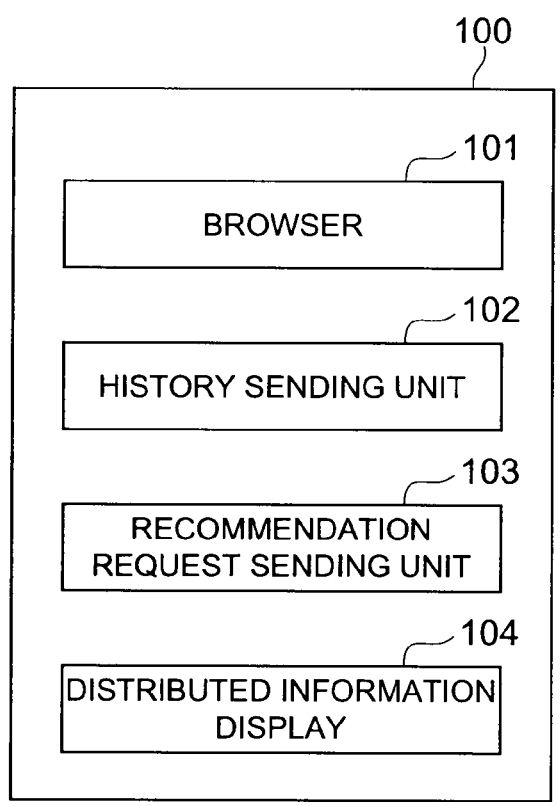
FIG. 9 is a block diagram of the functional configuration of the cell phone 100.

The cell phone 100 will now be described. FIG. 9 is a block diagram of the functional configuration of the cell phone 100. As illustrated in FIG. 9, the cell phone 100 is configured to include a browser 101, a history sending unit 102, a recommendation request sending unit 103, and a distributed information display 104. The cell phone 100 is configured with hardware such as a CPU, a RAM, and a ROM, in which the CPU is configured to operate according to the stored programs. More specifically, the cell phone 100 has a configuration similar to that of the information distribution server 200, which is achieved by the hardware configuration illustrated in FIG. 3. Each of the components will be described below.

The browser 101, which is an application part for connecting to the Internet, accesses a Web site arranged on the Internet to enable a user to browse contents maintained in the Web site. The browser 101 is configured to maintain the access history.

The history sending unit 102 sends the access history of the contents that is accessed by using the browser 101 (information of selected contents and non-selected contents on the identical menu screen). If the information distribution server 200 has a function to collect history information in each access, the history sending unit 102 is not necessarily configured.

The recommendation request sending unit 103 sends a request for recommendation information together with a user ID to the information distribution server 200 by a user operation of an operating unit, which is not shown.

The distributed information display 104 displays a menu screen and contents (Web pages) obtained by the browser 101.

The cell phone 100 configured as above can access the Internet by using the browser 101 and maintain the access history. The history sending unit 102 can send the access history in response to a request from the information distribution server 200 or at a predetermined time.

Figure 10:
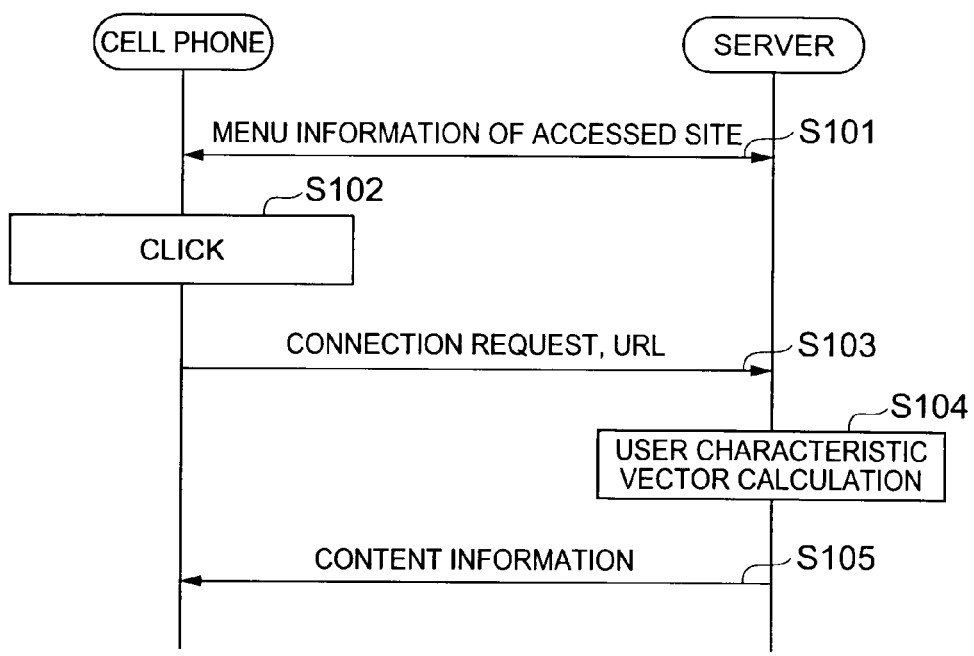
FIG. 10 is a sequence diagram showing the processing when contents are distributed in response to a request from the cell phone 100.

The operations of the cell phone 100 and the information distribution server 200 will now be described. FIG. 10 is a sequence diagram showing the processing of the cell phone 100 and the information distribution server 200 when distributing contents in response to a request from the cell phone 100.

As illustrated in FIG. 10, the content sending unit 208 distributes a menu screen from the information distribution server 200 in response to a request from the browser 101 in the cell phone 100 (S101). A user of the cell phone 100 selects an arbitrary content (corresponding to Node described above) from the menu screen and the browser 101 in the cell phone 100 receives the selection (S102). The connection request to the contents and its address, that is, URL are then sent to the information distribution server 200 (S103).

In the information distribution server 200, the content request receiving unit 201 receives the URL and the browsing history table 207c stores it as an access history. Based on the access history, a user characteristic vector is calculated and stored (S104). The content sending unit 208 obtains the contents based on the address requested in S103 from a contents provider (not shown) and distributes them (S105). The calculation processing of the user characteristic vector and the distribution processing of the contents may be performed in reverse order.

Figure 11:
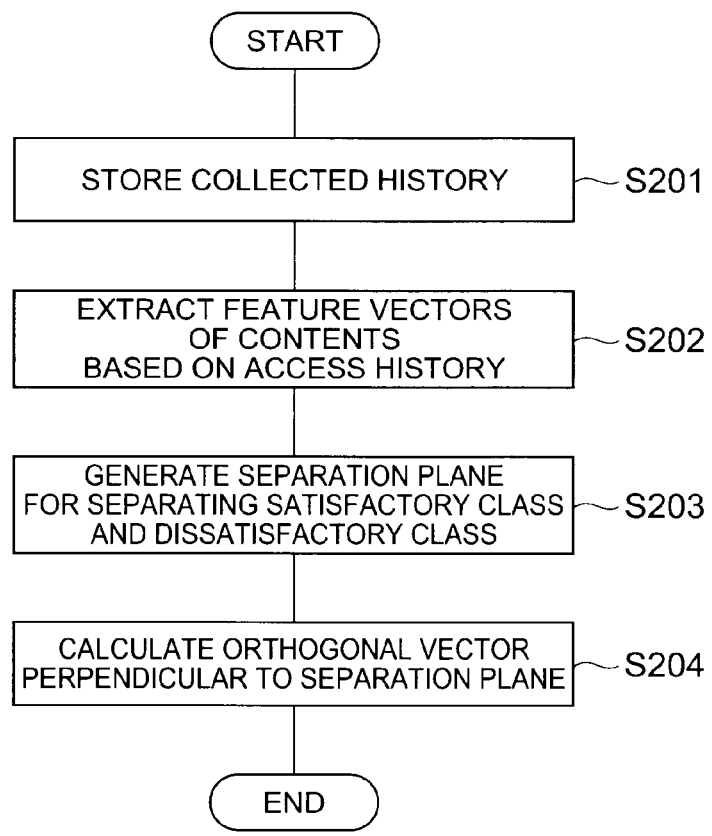
FIG. 11 is a flowchart showing the calculation processing of the user characteristic vector.

The calculation processing of the user characteristic vector in S104 will be described in detail. FIG. 11 is a flowchart showing the calculation processing of the user characteristic vector. As illustrated in FIG. 11, the browsing history table 207c stores the access request received by the content request receiving unit 201 or the access history information indicated by the access history as a newly-added access history (S201).

The history class separation unit 203 extracts characteristic vectors of the contents belonging to the satisfactory class or the dissatisfactory class based on the access history information stored in the browsing history table 207c (S202). The history class separation unit 203 then generates the separation plane for separating the satisfactory class and the dissatisfactory class based on the characteristic vectors (S203). The user characteristic vector calculation unit 204 then calculates an orthogonal vector perpendicular to the generated separation plane to obtain the user characteristic vector (S204). The user characteristic vector thus obtained is maintained in the user characteristic vector management table 207a and used for evaluation of the contents stored in the distributed information storage 205 when the recommendation information is distributed.

Figure 12:
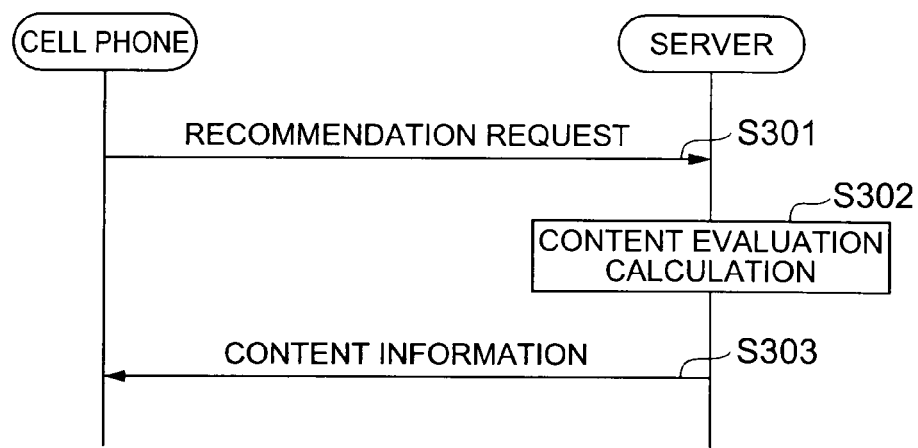
FIG. 12 is a sequence diagram when recommendation information is distributed.

The evaluation processing of the contents when recommendation information according to the present embodiment is distributed will be described. FIG. 12 is a sequence diagram when recommendation information is distributed. As illustrated in FIG. 12, the recommendation request sending unit 103 in the cell phone 100 sends a recommendation request including a user ID, and the recommendation request receiving unit 202 in the information distribution server 200 receives the recommendation request (S301). In the information distribution server 200, the contents stored in the distributed information storage 205 is evaluated (S302). The content evaluation unit 206 evaluates the contents in accordance with the user characteristic vector to generate the recommendation information in which the titles of the contents are arranged in descending order of evaluation. The content sending unit 208 then distributes the recommendation information thus generated (S303).

Figure 13:
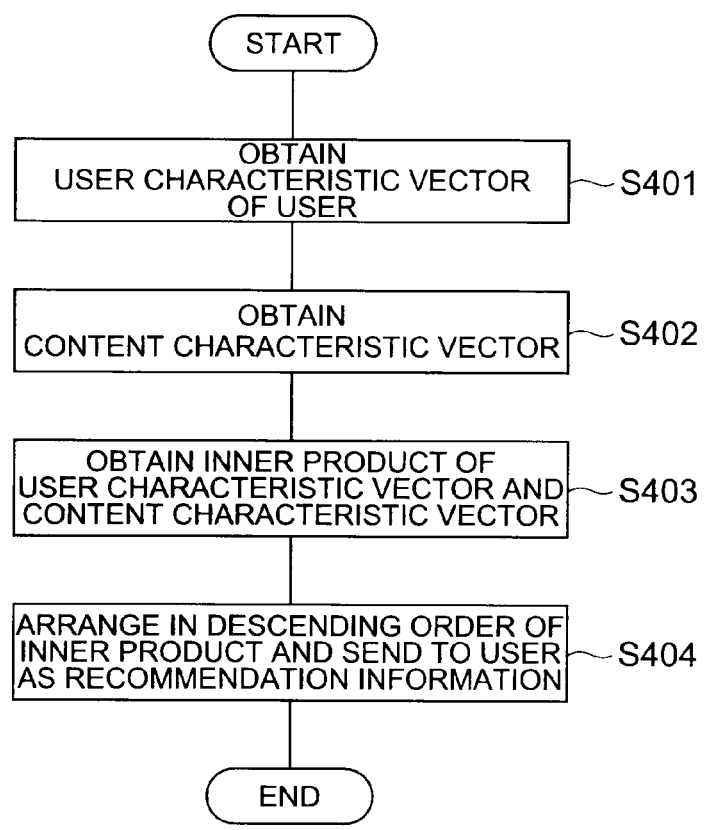
FIG. 13 is a flowchart showing the evaluation processing of contents.

The detailed processing of the content evaluation in S302 will be described. FIG. 13 is a flowchart showing the evaluation processing of the contents. As illustrated in FIG. 13, the content evaluation unit 206 obtains the corresponding user characteristic vector from the user characteristic vector management table 207a based on the user ID that is sent together with the recommendation request (S401). The content evaluation unit 206 then obtains the characteristic vectors of the contents from the content characteristic vector management table 207b (S402).

The content evaluation unit 206 calculates an inner product of the user characteristic vector and the characteristic vector of each of the contents (S403). The titles corresponding to the content IDs stored in the content management table 205a are extracted in descending order of the inner products calculated by the content evaluation unit 206, and the recommendation information is generated by arranging the titles in descending order of evaluation. The content sending unit 208 then sends the generated recommendation information to the cell phone 100 (S404).

In this manner, it is possible to provide the recommendation information to a user without any omissions according to the user characteristic vector.

<Generation of Separation Plane in Relative Space>

The method for generating the separation plane described above is performed according to the characteristic vector of the contents in the absolute space. To improve the accuracy, the method using a relative space in which relative position relations are calculated may be applicable. The method for generating a separation plane by using a relative space will be described below. The processing thereof has the same structure as that of the above method except for the processing content in the history class separation unit 203.

FIG. 14 shows configuration examples of menu screens in a history event a and a history event b. FIG. 14A shows the menu screen in the history event a, the menu screen being configured with Node 1 to Node 3. FIG. 14B shows the menu screen in the history event b, the menu screen being configured with Node 6 to Node 9. Node 3 is selected in FIG. 14A, and Node 9 is selected in FIG. 14B.

Figure 15:
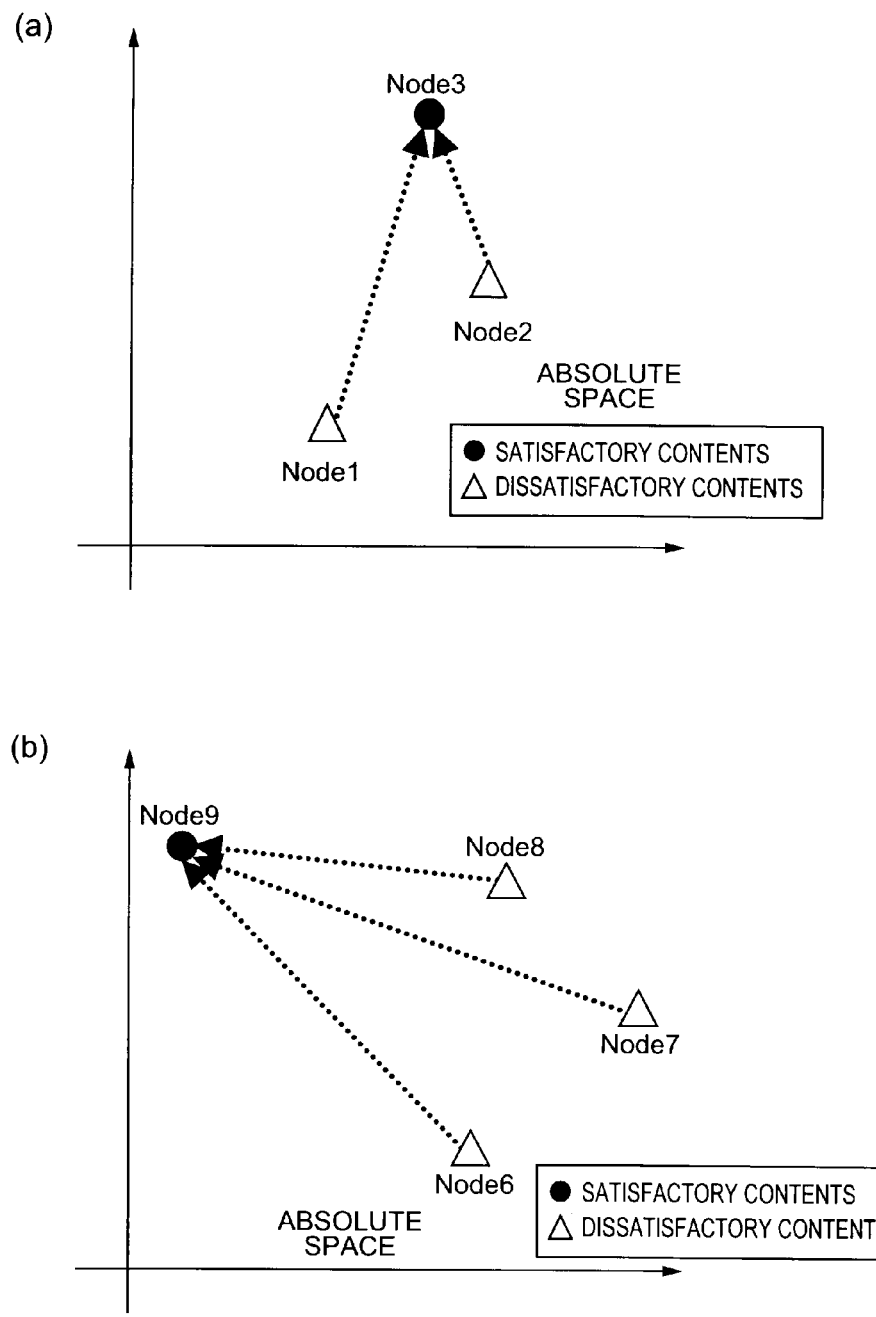
FIG. 15 is a diagram showing position relations of characteristic vectors of the contents selected on the menu screens in feature spaces.

FIG. 15 is a diagram showing position relations of the characteristic vectors of the contents selected on the menu screens illustrated in FIG. 14 in feature spaces. FIG. 15A shows the feature space (absolute space) of the contents selected in the history event a, and FIG. 15B shows the feature space (absolute space) of the contents selected in the history event b. In the same manner as described above, the selected contents are defined as the satisfactory contents, and the non-selected contents are defined as the dissatisfactory contents, whereby the contents can be classified into the satisfactory class and the dissatisfactory class, respectively.

Figure 16:
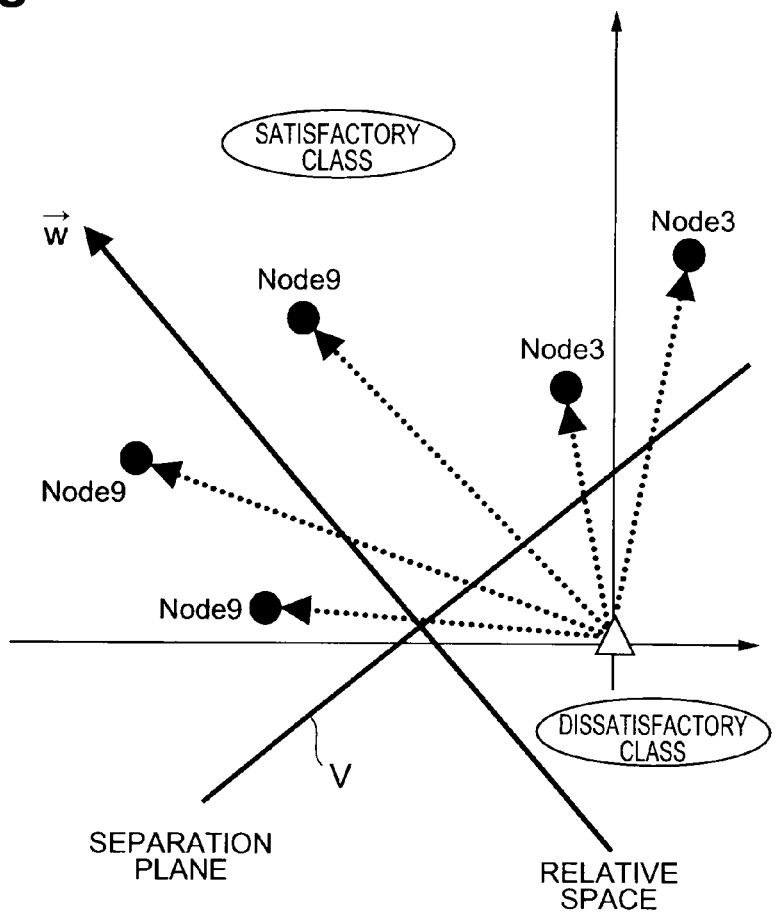
FIG. 16 is a diagram showing the characteristic vectors of the contents in the history events a and b in a relative space.

FIG. 16 is a diagram showing the characteristic vectors of the contents in the history events a and b in an identical feature space. FIG. 16 shows the relative space that indicates the positions of the characteristic vectors of the satisfactory contents when the characteristic vector of the dissatisfactory contents are set to the origin. To compare Node 2 to Node 3, and Node 1 to Node 3 relatively, for example, the feature space that indicates the positions of Node 3 with Node 1 and Node 2 being set to the origin, respectively, is defined as the relative space. More specifically, the relative space can be formed by subtracting the characteristic vector of Node 1 from the characteristic vector of Node 3. For the other Nodes, the relative space can be formed by subtracting the characteristic vector of the contents serving as the object in the same manner as described above.

In the relative space, as illustrated in FIG. 16, the history class separation unit 203 generates the separation plane for separating the satisfactory class and the dissatisfactory class based on the characteristic vectors of the satisfactory contents and those of the dissatisfactory contents. The user characteristic vector calculation unit 204 then calculates the user characteristic vector w, which is an orthogonal vector perpendicular to the separation plane.

In this manner, even when the history events are different from each other, the user characteristic vector can be generated by using the relative space, which makes it possible to generate a more discriminating user characteristic vector.

Figure 17:
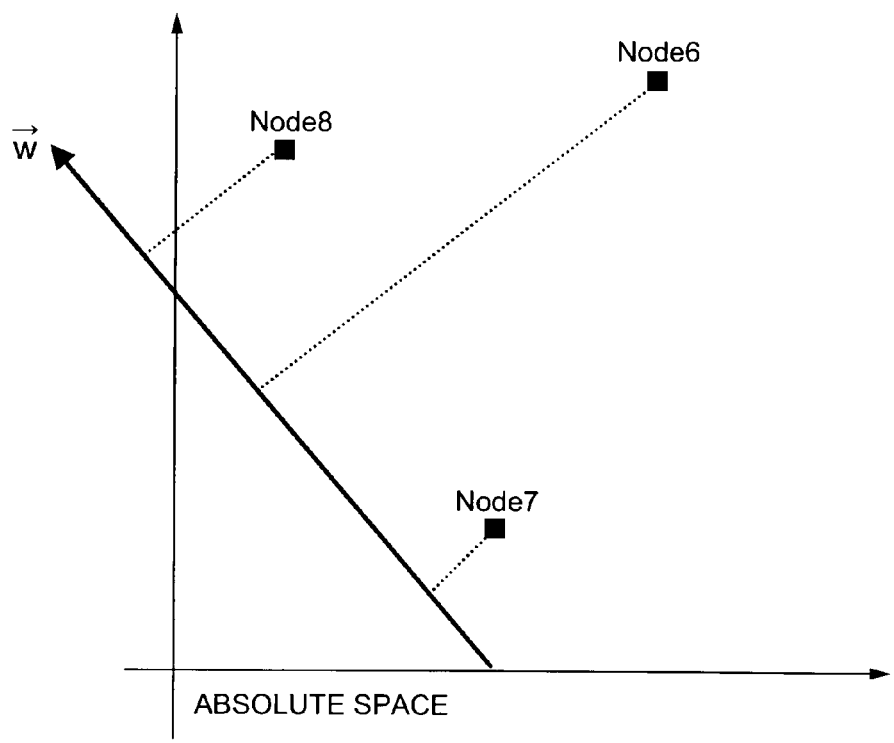
FIG. 17 is a diagram showing the concept when evaluation is performed based on the characteristic vector of each of the contents in an absolute space.

FIG. 17 is a diagram showing the concept when performing evaluation based on the characteristic vector of each of the contents in the absolute space. For example, Node 6 to Node 8, which are the unknown contents stored in the distributed information storage 205, are evaluated based on the generated user characteristic vector. In the same manner as described above, the content evaluation unit 206 can calculate the evaluation value by calculating an inner product of the user characteristic vector and the characteristic vector of each of the contents. Conceptually, in the same manner as described above, the contents are prioritized in descending order of the positions of the points projected to the user characteristic vector, that is, the intersection points of the perpendiculars therewith in the direction of the vector.

In this manner, the separation plane is generated by using the relative space, thus making it possible to generate the user characteristic vector. In FIG. 15 to FIG. 17, even if the feature spaces are treated as absolute spaces, the separation planes can be generated. However, the feature space may be composed of characteristic vectors that cannot generate a separation plane. In this case, the separation plane can be generated by using the above-described relative space. The method thereof will be described below.

Figure 18:
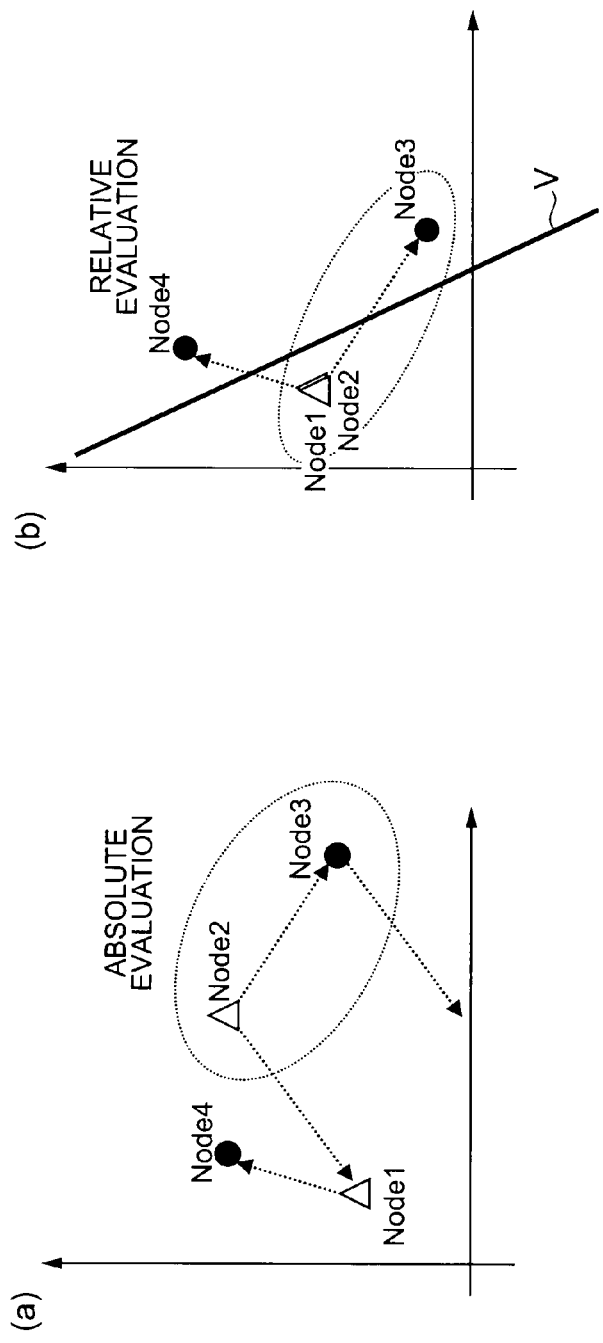
FIG. 18 is an explanatory diagram when processing is performed with the relative space in the case where the separation plane cannot be generated.

FIG. 18A is a diagram showing characteristic vectors of contents in an absolute space. In FIG. 18A, it is assumed that Node 1 and Node 4 are the contents existing in the same event (menu screen), and that Node 2 and Node 3 are the contents existing in the same event. The circles are the characteristic vectors of the selected contents (satisfactory class) and the triangles are the characteristic vectors of the non-selected contents (dissatisfactory class).

As is obvious in FIG. 18A, the separation plane cannot be generated with respect to the contents of the characteristic vectors that have such position relations in the absolute space. The separation plane, which is a plane for separating the satisfactory class and the dissatisfactory class, cannot separate the classes without excess or deficiency in the example of FIG. 18A. Therefore, the absolute space needs to be transformed into the relative space that indicates relative position relations to generate the separation plane.

FIG. 18B is a diagram showing the characteristic vectors of the contents in a relative space. In the example of FIG. 18B, because Node 2 is translated such that Node 1 and Node 2 are present in the identical position, Node 3 corresponding to Node 2 is also translated. Such transformation of the absolute space into the relative space makes it possible to generate the separation plane v that can separate Node 1 (Node 2), which is the dissatisfactory contents, and Node 3 and Node 4, which are the satisfactory contents.

As described above, even if the separation plane cannot be generated in the absolute space, the separation plane can be generated by transforming the absolute space into the relative space, thus making it possible to calculate the user characteristic vector.

<Method for Generating Separation Plane in view of Browse Frequency>

The processing in the history class separation unit 203 when weighting is carried out by using the browse frequency of the contents and a separation plane is generated with the weighted characteristic vector will be described. The generation of the separation plane by using the NN method will be described below.

Figure 19:
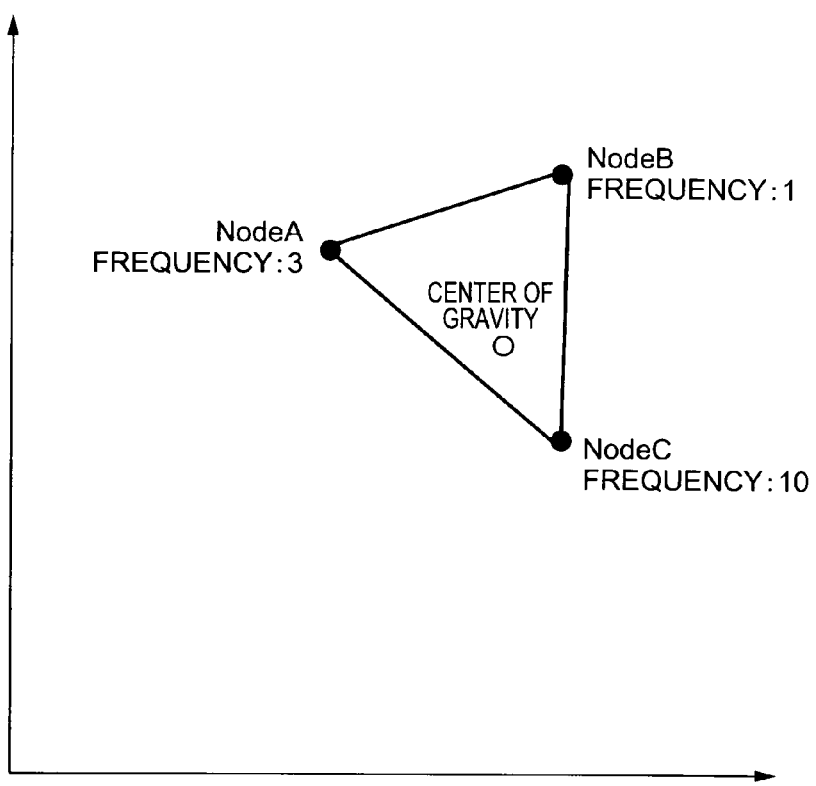
FIG. 19 is a conceptual diagram showing the processing for calculating the center of gravity of characteristic vectors in view of the browse frequency.

FIG. 19 is a conceptual diagram showing the processing for calculating the center of gravity of characteristic vectors in view of the browse frequency, which shows the feature space that indicates the positions of the characteristic vectors of the contents $c_1$ to $c_3$ corresponding to Node A to Node C. It is assumed that the browse frequency of the content $c_1$ is three times, that of the content $c_2$ is once, and that of the content $c_3$ is ten times. The browsing history table 207c preferably stores the browsing history of the browsed contents and the non-browsing history of the non-browsed contents, and needs to maintain the frequencies or store them in a state of being calculable.

In this case, the center of gravity of the contents $c_1$ to $c_3$ is calculated by the following formula (I):

[Formula 1]

$$\text{Center of gravity} = \frac{\sum_i c_i n_i}{\sum_i n_i} \quad (1)$$

It is to be noted that $c_i$ represents the characteristic vector of the browsed contents, and that $n_i$ represents the browse frequency.

The center of gravity is determined by calculating the formula. In the same manner as described above, the center of gravity of the non-browsed contents, which is not shown, is also calculated by Formula (1) using the characteristic vectors of the non-browsed contents. The line connecting the center of gravity of the non-browsed contents and that of the browsed contents can be obtained as a user characteristic vector. Because the line is in the same direction as the line perpendicular to the separation plane, it is possible to calculate the separation plane and then obtain an orthogonal vector perpendicular to the separation plane. The separation plane, however, is not always necessary in the NN method.

Accordingly, using the browse frequency of the contents makes it possible to obtain the user characteristic vector, which is close to the user preferences compared to the case where the browse frequency is not used. Therefore, the contents can be evaluated according to the user preferences.

<Method for Generating Separation Plane in view of Selection Order>

The processing in the history class separation unit 203 when a separation plane is generated in view of the order of the browsed contents will be described. Contents accessed most recently are generally assumed to be more important or more close to user preferences than contents accessed before that. The larger the time differences therebetween become, the more greatly the user preferences vary. Thus, it is obvious that the contents accessed more recently are more important. The processing when a separation plate is generated in view of the time differences (time-series components) will be described.

FIG. 20 is an explanatory diagram showing the processing for generating a user characteristic vector by the NN method in chronologically accessed order when the history class separation unit 203 generates a separation plane. FIG. 20A is an explanatory diagram of the menu screen, FIG. 20B is an explanatory diagram of the selection history of the contents selected by a user, FIG. 20C is a conceptual diagram showing characteristic vectors of the contents in the feature space, and FIG. 20D is a conceptual diagram for explaining the generation of the separation plane in view of the selection order. The selection history is stored in the browsing history table 207c.

As illustrated in FIG. 20A, the menu screen is configured with Node A to Node F. As illustrated in FIG. 20B, the contents are selected in order of Node A, Node B, and Node C. Thus, Node A, Node B, and Node C are the contents classified into the satisfactory class, and Node D, Node E, and Node F are the contents classified into the dissatisfactory class.

The concept of the processing when the separation plane is generated will be described with reference to FIG. 20C and FIG. 20D. As illustrated in FIG. 20C, Node A to Node F are positioned in the feature space according to the characteristic vectors thereof. The calculation is then performed such that the characteristic vector selected most recently has a great influence. As illustrated in FIG. 20D, the middle point w1 of Node A and Node B is calculated, and then the middle point w2 of the middle point w1 and Node C is calculated to obtain the center of gravity of the satisfactory class.

By contrast, the center of gravity w3 of the dissatisfactory class is calculated based on Node D, Node E, and Node F. Because the concept of selection order does not exist in the dissatisfactory class, the center of gravity w3 based on the three nodes is calculated in the same manner as the normal processing. The separation plane v whose perpendicular is the line connecting the middle point w2 and the center of gravity w3 is then generated. In the present embodiment, an orthogonal vector perpendicular to the separation plane v is defined as the user characteristic vector, which is identical to the line connecting the center of gravity w3 and the middle point w2. Although the separation plane is calculated as a matter of convenience for the explanation of the present embodiment, the separation plane is not necessarily calculated when the NN method is used.

In this manner, a middle point of a characteristic vector and another characteristic vector is calculated, and a middle point of the obtained middle point and still another characteristic vector is then calculated to obtain the middle points in chronological order (the NN method is applied). Therefore, older access histories are less weighted, which makes it possible to calculate the center of gravity in view of the chronological order.

<Application to Operation Menu>

In the methods described above, the menu screen that is sent from the information distribution server 200 serving as a Web site is explained as an example. However, the menu screen is not limited thereto, and recommendation operation information can be displayed on the operation menu of the cell phone 100 as recommendation information, for example.

For example, by allotting a characteristic vector to each of the operation items on the operation menu, and generating a user characteristic vector related to a user operation according to a user operation history, the recommendation operation information may be generated based on the user characteristic vector when a user sends a request for the recommendation operation information. The operation history information is configured to be sent and stored to and in the information distribution server 200 from the cell phone 100 at a predetermined time.

FIG. 21 is an explanatory diagram showing parameters of characteristic vectors in a feature space related to the operation. As illustrated in FIG. 21, "incoming message", "videophone", "One Seg", "screen memo", and "text memo" are specified as terminal functions of the cell phone 100. As for the parameters that constitute the characteristic vectors, "phone", "Internet", "text", "memo", and "TV" are specified. In this manner, the characteristic vectors are specified with respect to the functions of the cell phone 100. For example, the parameters of "phone" and "text" are allotted with 1 in "incoming message", which indicates that "incoming message" is a function related to a phone and a text. The distributed information storage 205 stores all of the terminal function information, and receives the notification of when a user performs an operation to display the operation menu. The content evaluation unit 206 evaluates the operation information and generates appropriate recommendation operation information. The content sending unit 208 sends the recommendation operation information to display the information in the cell phone 100.

In this manner, operations similar to or related to the operations performed by a user can be notified the user by applying the evaluation method according to the present embodiment to the operation menu and providing recommendation operation information to the user.

Figure 22:
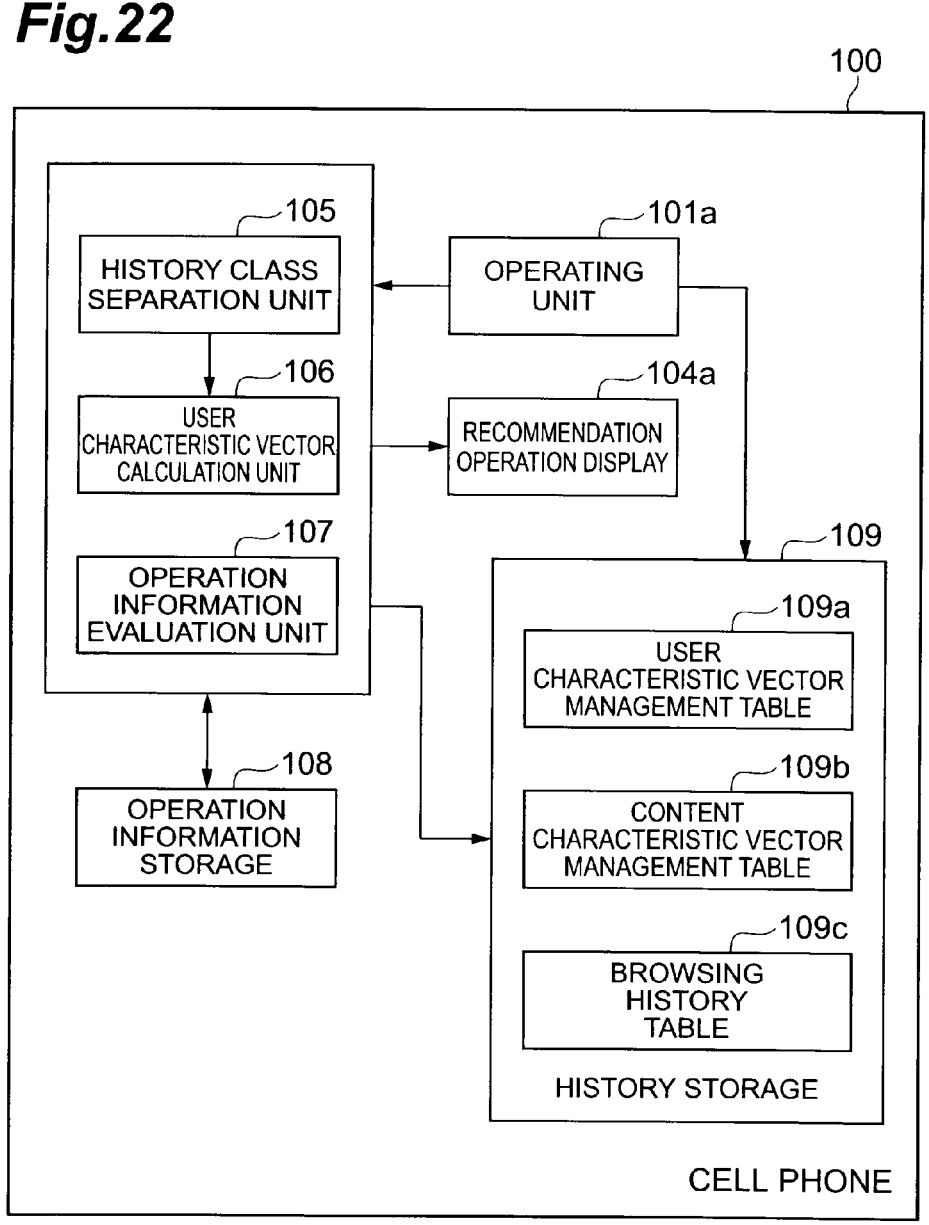
FIG. 22 is a block diagram of the functions of a cell phone 100a that can display recommendation operation information.

The processing may be performed in a cell phone without connecting to the information distribution server 200. FIG. 22 is a block diagram of the functions of a cell phone 100a that can display recommendation operation information. The hardware configuration thereof is the same as that in FIG. 3.

The cell phone 100a is configured to include an operating unit 101a, a recommendation operation display 104a, a history class separation unit 105, a user characteristic vector calculation unit 106, an operation information evaluation unit 107, an operation information storage 108, and a history storage 109.

Each of the components will be described below. The operating unit 101a, which performs the functions installed in the cell phone 100a, is configured with a numerical keypad, a touch panel or the like.

The recommendation operation display 104a displays recommendation operation information, which indicates an unknown operation for a user determined according to the user operation history, as described later.

The history class separation unit 105, the user characteristic vector calculation unit 106, the operation information evaluation unit 107, the operation information storage 108, and the history storage 109 correspond to the history class separation unit 203, the user characteristic vector calculation unit 204, the distributed information storage 205, the content evaluation unit 206, and the history storage 207 in the information distribution server 200 as illustrated in FIG. 2, respectively. The history class separation unit 105 generates a separation plane for separating operated functions and non-operated functions in an identical operation menu into satisfactory functions and dissatisfactory functions, respectively. The user characteristic vector calculation unit 106 calculates an orthogonal vector perpendicular to the generated separation plane as a user characteristic vector. The operation information evaluation unit 107 evaluates the functions based on function characteristic vectors in accordance with the calculated user characteristic vector, and edits the menu screen such that highly evaluated functions are displayed on the operation menu. When displaying the operation menu, a user can confirm the highly evaluated functions thereon.

The functional effects of the cell phone 100 and the information distribution server 200 according to the present embodiment will be described. In the cell phone 100, the menu screen is displayed by operating the browser, on which a plurality of optional items indicating contents, such as Node 1 to Node 5, is displayed. When an arbitrary content is selected out of the contents by a user operation, the cell phone 100 sends selected contents and non-selected contents to the information distribution server 200, and the information distribution server 200 (content request receiving unit 201) receives the contents. The content request receiving unit 201 obtains the selected contents from a contents provider, and the content sending unit 208 sends the contents to the cell phone 100.

The browsing history table 207c stores characteristic vectors of the selected contents and those of the non-selected contents. The history class separation unit 203 generates a separation plane for separating the characteristic vectors of the selected contents and those of the non-selected contents stored in the browsing history table 207c in a feature space. The user characteristic vector calculation unit 204 generates a user characteristic vector based on an orthogonal vector perpendicular to the generated separation plane, and the user characteristic vector management table 207a stores the user characteristic vector. Subsequently, when the recommendation request receiving unit 202 receives a recommendation request, the content evaluation unit 206 evaluates the contents based on the stored user characteristic vector.

In this manner, contents can be evaluated in accordance with a vector indicating user characteristics. Therefore, contents that are to be recommended are evaluated without direct information, such as tastes and preferences of the user, and an access history, which makes it possible to provide the contents to the user without any omissions.

In the information distribution server 200 according to the present embodiment, the history class separation unit 203 preferably calculates relative position relations between characteristic vectors of all of the non-selected contents and that of the selected contents to generate a separation plane based on the position relations. In other words, the history class separation unit 203 preferably calculates the position relations such that another characteristic vector is positioned on a characteristic vector of the non-selected contents or the selected contents to form a relative space, and generates the separation plane in the relative space. In this manner, the separation plane can be formed in the relative space indicating the relative position relations and the user characteristic vector can be generated based on the separation plane. Therefore, it is possible to evaluate the contents more accurately.

In the information distribution server 200 according to the present embodiment, the browsing history table 207c stores the browse frequency and the non-browse frequency of the contents. The browse frequency and the non-browse frequency may be calculated when necessary based on the browsing history without being stored. The characteristic vectors of the contents with high browse frequency are weighted depending on the frequency and those of the contents with high non-browse frequency are weighted depending on the frequency. The separation plane for separating the contents into the satisfactory class and the dissatisfactory class can be generated based on the weighted characteristic vectors. In this manner, the user characteristic vector can be calculated depending on the frequency, whereby the user characteristic vector can be calculated more accurately. Therefore, it is possible to evaluate the contents more accurately.

In the information distribution server 200 according to the present embodiment, the content management table 205a stores the time of selection of the contents on the menu screen together with the characteristic vector of the contents, thus making it possible to generate the separation plane based on the characteristic vector of the contents that is weighted depending on the recency of the time of selection. In the NN method, for example, by calculating the centers of gravity of the characteristic vectors from the older contents in chronological order, weighting depending on the recency of the time of selection is carried out consequently. Therefore, the characteristic vector can be weighted in view of time-series components, which makes it possible to evaluate the contents more accurately.

In the information distribution server 200 according to the present embodiment, the content sending unit 208 sends the recommendation information that is generated in accordance with the evaluation results by the content evaluation unit 206, enabling a user to obtain useful information.

The invention claimed is:

1. A recommendation information evaluation apparatus comprising:
a processor;
a receiving unit that receives a selection of one optional item from a plurality of optional items by a user operation, the plurality of optional items being displayed for the user;
a memory that stores a satisfactory feature vector that is a vector of the selected optional item received by the receiving unit and dissatisfactory feature vectors that are vectors of non-selected optional items that were among the plurality of optional items displayed for the user but were not selected;
a separation plane generating unit that generates a separation plane for separating in a feature space the satisfactory feature vector of the selected optional item and the dissatisfactory feature vectors of the non-selected optional items, which are stored in the memory, such that the separation plane is a plane that maximizes a distance between the plane and nodes of the satisfactory feature vectors and nodes of the dissatisfactory feature vectors;
a user characteristic vector generating unit, implemented by the processor, that generates an orthogonal vector perpendicular to the separation plane, as a user characteristic vector; and
an evaluation unit that evaluates an unknown optional item, which is an item that has not been previously displayed to the user for selection, based on the user characteristic vector generated by the user characteristic vector generating unit by calculating an inner product of the user characteristic vector and a characteristic vector of the unknown optional item,
wherein the separation plane generating unit calculates the relative position and distance relations in an absolute space between each of a plurality of dissatisfactory feature vectors and a satisfactory feature vector for at least one particular instance of a plurality of optional items being previously displayed for the user, sets all of the dissatisfactory feature vectors to a single origin point in a relative space and sets separate nodes representing the satisfactory feature vectors each a certain position and distance from the origin point in the relative space respectively based on each of the relative positions calculated in the absolute space, and generates the separation plane based on separating the nodes and the origin point in the relative space.

2. The recommendation information evaluation apparatus according to claim 1, wherein the separation plane generating unit generates the separation plane based on the SVM (support vector machine) method.

3. The recommendation information evaluation apparatus according to claim 1, wherein the memory stores frequency of selection of an optional item together with the satisfactory feature vector of the optional item, and stores frequency of non-selection of an optional item together with the dissatisfactory feature vector of the optional item, the user characteristic vector generating unit weights the satisfactory feature vector with high frequency of selection depending on the frequency, weights the dissatisfactory feature vector with high frequency of non-selection depending on the frequency, and generates the user characteristic vector based on the satisfactory feature vectors and the dissatisfactory feature vectors including the weighted satisfactory feature vector and the weighted dissatisfactory feature vector.

4. The recommendation information evaluation apparatus according to claim 1, wherein the memory stores time of selection of an optional item together with the satisfactory feature vector of the optional item, and the separation plane generating unit generates the user characteristic vector based on the satisfactory feature vector of the optional item that is weighted depending on recency of the time of selection and non-selection.

5. The recommendation information evaluation apparatus according to claim 1, further comprising a recommendation information sending unit that sends recommendation information generated in accordance with evaluation results by the evaluation unit.

6. The recommendation information evaluation apparatus according to claim 1, wherein the optional items are items on a menu screen for browsing a Web page.

7. The recommendation information evaluation apparatus according to claim 1, wherein the optional items are items on an operation menu for performing functions of the apparatus.

8. A recommendation information evaluation method comprising:

receiving a selection of one optional item from a plurality of optional items by a user operation, the plurality of optional items being displayed for the user;

storing, in a memory, a satisfactory feature vector that is a vector of the selected optional item received in the receiving and dissatisfactory feature vectors that are vectors of non-selected optional items that were among the plurality of optional items displayed for the user but were not selected;

generating a separation plane for separating in a feature space the satisfactory feature vector of the selected optional item and the dissatisfactory feature vectors of the non-selected optional items, which are stored in the memory, such that the separation plane is a plane that maximizes a distance between the plane and nodes of the satisfactory feature vectors and nodes of the dissatisfactory feature vectors;

generating a user characteristic vector based on an orthogonal vector perpendicular to the separation plane; and evaluating an unknown optional item, which is an item that has not been previously displayed to the user for selection, based on the generated user characteristic vector by calculating an inner product of the user characteristic vector and a characteristic vector of the unknown optional item, wherein the generation of the separation plane includes calculating the relative position and distance relations in an absolute space between each of a plurality of dissatisfactory feature vectors and a satisfactory feature vector for at least one particular instance of a plurality of optional items being previously displayed for the user, setting all of the dissatisfactory feature vectors to a single origin point in a relative space and setting separate nodes representing the satisfactory feature vectors each a certain position and distance from the origin point in the relative space respectively based on each of the relative positions calculated in the absolute space, and generating the separation plane based on separating the nodes and the origin point in the relative space.

9. A non-transitory computer-readable medium that stores a computer program that includes instructions which when executed on a computer causes the computer to execute a recommendation information evaluation method comprising:

receiving a selection of one optional item from a plurality of optional items by a user operation, the plurality of optional items being displayed for the user;

storing, in a memory, a satisfactory feature vector that is a vector of the selected optional item received in the receiving and dissatisfactory feature vectors that are vectors of non-selected optional items that were among the plurality of optional items displayed for the user but were not selected;

generating a separation plane for separating in a feature space the satisfactory feature vector of the selected optional item and the dissatisfactory feature vectors of the non-selected optional items, which are stored in the memory, such that the separation plane is a plane that maximizes a distance between the plane and nodes of the satisfactory feature vectors and nodes of the dissatisfactory feature vectors;

generating a user characteristic vector based on an orthogonal vector perpendicular to the separation plane; and evaluating an unknown optional item, which is an item that has not been previously displayed to the user for selection, based on the generated user characteristic vector by calculating an inner product of the user characteristic vector and a characteristic vector of the unknown optional item, wherein the generation of the separation plane includes calculating the relative position and distance relations in an absolute space between each of a plurality of dissatisfactory feature vectors and a satisfactory feature vector for at least one particular instance of a plurality of optional items being previously displayed for the user, setting all of the dissatisfactory feature vectors to a single origin point in a relative space and setting separate nodes representing the satisfactory feature vectors each a certain position and distance from the origin point in the relative space respectively based on each of the relative positions calculated in the absolute space, and generating the separation plane based on separating the nodes and the origin point in the relative space.

* * * * *